United States Patent Office 3,367,094
Patented Feb. 6, 1968

3,367,094
BALER FEED MECHANISM
Lawrence Harwig, P.O. Box 94,
Cheyenne Wells, Colo. 80810
Filed July 25, 1966, Ser. No. 567,745
6 Claims. (Cl. 56—364)

This invention relates to a mechanism for feeding crop material to the baling chamber of a pick-up baler, and more particularly to an attachment for a finger-type feeding mechanism, which facilitates the feeding of certain crops to the bale chamber.

Agricultural balers conventionally include a baling chamber, a crop pickup means for picking up previously harvested and windrowed crops as the machine advances, and means for moving the crop from the pickup means into the bale chamber. Various types of conveyor means for accomplishing the last-named function have been designed. One type of widely used conveyor system features a transverse auger rearwardly of the crop pickup means and operative to move the crop adjacent to the feed opening of the bale chamber and a pair of fingers engageable with the crop at the discharge end of the auger and operative to move the crop through the feed opening into the bale chamber, the fingers moving in a curved path rearwardly of and past the discharge end of the auger. While such a system works well in most crops, problems have arisen with the feeding of tall and coarse crops such as sorghum or the like.

The primary object of the present invention is to provide auxiliary finger means for attachment to such feeder fingers to improve feeding of such tall and coarse crops into the bale chamber, and more specifically to provide a pair of auxiliary fingers attachable to and extending from said feeder fingers toward the intake end of the auger, extending the reach of the feeding mechanism, the auxiliary fingers moving in a curved path rearwardly adjacent to and past an intermediate portion of the auger in addition to moving past the discharge end of the auger.

Another object of the invention is to provide such auxiliary feeder fingers which can be optionally added to the machine at the time of manufacture or can be provided as a bundle for addition to machines already in the field.

Still another object is to provide such auxiliary feeder fingers which are of simple and rugged construction, inexpensive to manufacture and to attach to such baler feeder mechanisms.

These and other objects of the invention will become apparent from the following detailed description and accompanying drawings wherein.

Figure 1:
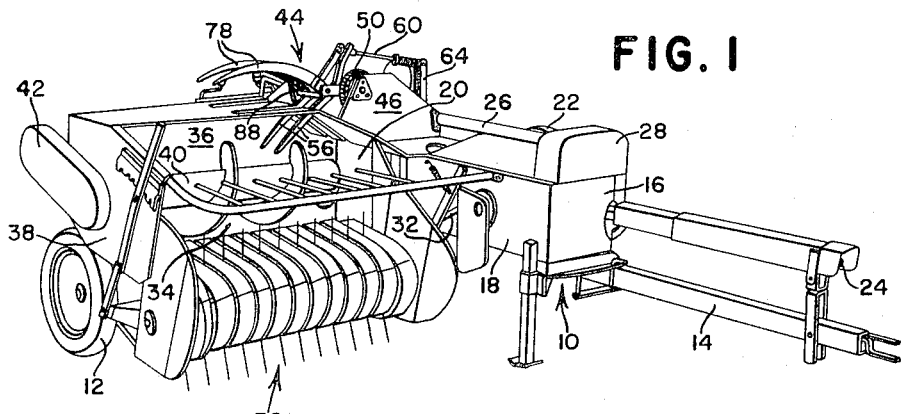
FIG. 1 is a front perspective view of a typical baler embodying the present invention.

The baler chosen for purpose of illustration is of conventional construction and comprises a mobile main frame 10 mounted on support wheels 12 for advance over a field of previously harvested crops, the main frame 10 including a forwardly extending draft member 14 by means of which the baler is connectable to a draft vehicle, conventionally an agricultural tractor. An elongated, fore-and-aft extending bale case 16 is mounted on the frame 10 and includes an upright inner wall 18, which forms a feed opening 20. A plunger (not shown) reciprocates within the bale case 16 to compress the crop therein and is driven by a conventional drive mechanism, which includes a flywheel 22 and is connected to and powered by a shielded power take-off shaft 24, which, in turn, is connectable at its forward end to the tractor power take-off shaft in the conventional manner. A fore-and-aft drive shaft 26 is also connected to and powered by the shaft 24 through suitable gearing mounted within the housing 28.

Laterally offset from the bale case 16 is a crop pickup means 30, mounted for vertical adjustment on the main frame 10 and driven by a pickup drive mechanism 32, which in turn is also connected to and powered by the shaft 24. The pickup means 30 removes the crop from the field as the machine advances and delivers it rearwardly to a generally horizontal floor or deck 34, which is mounted on the frame 10 and extends rearwardly from the pickup means 30 and laterally and outwardly from the feed opening 20, an upright rear wall 36 defining the rear edge of the floor 34, and an upright outer or right-hand wall 38 defining the outer edge of the floor. A transverse auger-type conveyor 40 is supported at its outer or right-hand end in the outer wall 38 above the floor 34 and is rotated by a drive mechanism partly contained in safety shielding 42 and connected to the drive shaft 26, the auger-type conveyor 40 moving the crop material transversely along the floor 34 to a point adjacent to the feed opening 20.

The crop is moved from the discharge end of the conveyor 40 through the feed opening 20, and into the bale case 16 by a feeding mechanism, indicated generally by the numeral 44. The feeding mechanism is mounted on an upright support member 46 extending upwardly from the top of the bale case 16, the drive shaft 26 being journaled at the left-hand edge of the support member 46 and a fore-and-aft shaft 48 being journaled at the upper right-hand corner of the support member 46. The shaft 48 is connected to and driven by the drive shaft 26 by a chain-and-sprocket-type drive 50 and rigidly carries a crank arm 52, which rotates in an upright transverse plane about the axis of the shaft 48 and carries a fore-and-aft pivot 54 at its outer end. Two parallel, rigidly connected feeder fingers 56 are swingably mounted on the pivot 54 intermediate their ends, the upper ends of the fingers 56 being pivotally connected to one end of a generally transverse rod 60, having its other end pivotally connected at 62 to an upright post 64. The pivots 54, 58, and 62 are parallel, so that the upper ends of the feeder fingers 56 swing in an arc about the pivot 62 as the arm 52 rotates with the shaft 48, while the free or terminal ends 68 of the feeder fingers trace parallel curved paths in upright transverse planes, the paths being indicated by the numeral 70 in FIG. 2. Each path 70 includes a lower working portion 72, during which the finger ends 68 move downwardly past the discharge end of the conveyor 40 and then laterally through the feed opening and into the bale case 16, and a return portion 74, wherein the finger ends move upwardly, emerging from the top of the bale case and returning to the start of the working portion a substantial distance above the floor 34. The fingers engage the crop material and move it into the bale case during the working portion 72 of their movement and clear the crop material in the return portion 74. A shock absorbing spring 76 is mounted in the rod 60 to protect the feeding mechanism from damage as a result of oversized charges of crop material or from striking a solid object.

A pair of parallel auxiliary feeder fingers 78 have one end attached to the feeder fingers 56 adjacent the pivot 54, the auxiliary feeder fingers 78 extending outwardly and then curving downwardly from the feeder fingers 56. The feeder fingers 78 move in a generally upright transverse plane with the feeder fingers 56, so that their terminal ends 80 trace curved paths 82 respectively aligned with and similar to the paths 70 of the fingers 56, each path 82 also including a working portion 84, during which the fingers 78 move downwardly rearwardly adjacent of the auger-type conveyor 40 and then inwardly toward the feed opening 20 to move the crop material toward the feed opening, and a return portion 86, wherein the fingers 78 are withdrawn from contact with the crop. The fingers 78 are rigidly connected by a bight portion 88 extending between their inner ends, the auxiliary fingers preferably being removably attachable to the fingers 56 by fasteners 90 connecting the bight portion 88 to a cross-piece (not shown) between the fingers 56 at the pivot 54. The auxiliary fingers 78 could also be permanently attached to the fingers 56 by welding or similar means.

Figure 2:
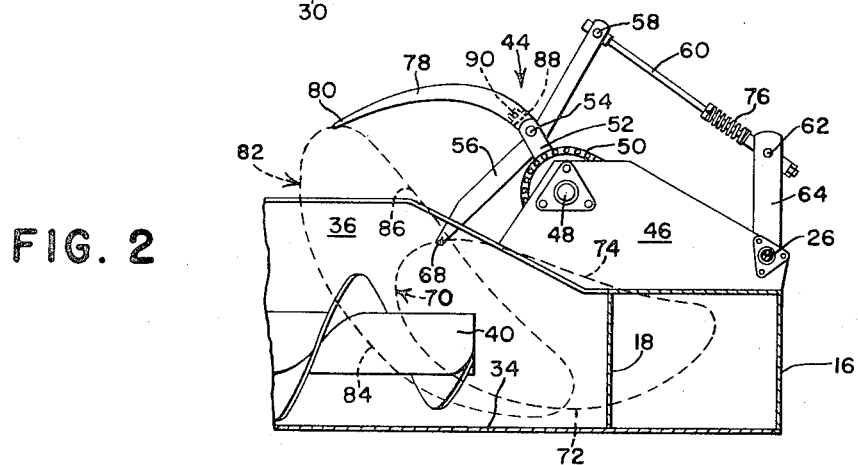
FIG. 2 is a transverse elevational section of a portion of the baler, showing a portion of the auger, the bale case, and the feeder mechanism in one position of its curved path.
Figure 3:
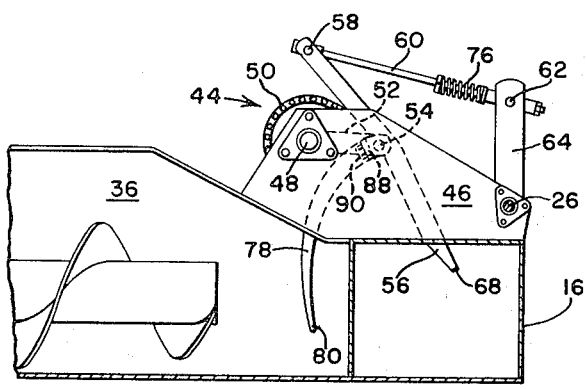
FIG. 3 is a view similar to FIG. 2 but showing the feeder mechanism in a second position along its curved path.

As is apparent from FIG. 2, the main feeder fingers 56 move past the discharge end of the auger-type conveyor 40 while the path 82 of the auxiliary feeder fingers is more toward the intake end of the conveyor 40, the ends 80 of the fingers 78 moving past an intermediate portion of the auger-type conveyor 40 during the working portion of their path. The extended reach afforded by the auxiliary fingers 78 has been found to be advantageous for proper feeding of the baler when operating in tall and coarse crops such as sorgum or the like. As is apparent from the above, the auxiliary feeder fingers 78 can be provided as an optional attachment for the baler if the baler is to be used in such tall and coarse crops, avoiding the added expense of the auxiliary feeder fingers 78 if the baler is to be utilized only in the more prevalent crops such as alfalfa hay or the like. Of course, the auxiliary feeder fingers 78 could also be provided for machines already in the field, wherein the type of crop being baled has resulted in problems in the proper feeding of the bale case 16.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a baler having an elongated, generally horizontal bale chamber with an upright side wall formed with a feed opening, a plunger reciprocatable longitudinally within said bale case and movable across said feed opening, a crop-receiving floor extending horizontally and outwardly from the lower edge of the feed opening, a crop pickup means for depositing crops on the floor, and a rotatable conveyor means operatively mounted above said floor for moving the crop material along the floor toward said feed opening, the combination therewith of an improved feeding mechanism operatively associated with the discharge end of said conveyor means for moving the crop material from the conveyor means through the feed opening and comprising: a first crop-engaging finger means movable in a timed relationship with said plunger in a curved, generally upright path, transverse to said plunger movement, and including a working portion, wherein the finger means move downwardly past the discharge end of said conveyor means, transversely, and then through the feed opening to move the crop material into the bale chamber when the plunger is clear of said feed opening, and a return portion, wherein it withdraws from said chamber and returns to the start of its working portion a relatively greater distance above the said floor than during its work, and auxiliary feeder finger means connected at one end to the first feeder finger means and extending laterally therefrom toward the intake end of the conveyor means and downwardly toward the floor and movable therewith in a similar curved path spaced toward the intake end of the conveyor means from the path of the first finger means.

2. The invention defined in claim 1 wherein the path of the auxiliary feeder finger means includes a working portion which commences adjacent to an intermediate portion of the conveyor means and terminates outside the bale case.

3. The invention defined in claim 2 wherein the conveyor means includes an auger rotatable about an axis aligned with the feed opening and transverse to the plunger movement.

4. The invention defined in claim 3 wherein the first feeder finger means includes a plurality of fingers aligned in a fore-and-aft direction, moving in a transverse upright plane, and having their terminal ends moving proximate to the discharge end of said auger means in the working portion of their paths, and the auxiliary feeder finger means includes a plurality of similar fingers aligned in a fore-and-aft direction, also moving in a transverse upright plane, and having their terminal ends moving adjacent to and rearwardly of an intermediate portion of the auger during the working portion of their paths.

5. The invention defined in claim 4 wherein the auxiliary finger means is removably attached to the first feeder finger means.

6. The invention defined in claim 5 wherein the first feeder finger means includes a pair of parallel fingers and the auxiliary feeder finger means also includes a pair of parallel fingers respectively in substantial transverse alignment with the first feeder fingers.

References Cited

UNITED STATES PATENTS

| | | | |
|---|---|---|---|
| 2,450,082 | 9/1948 | Crumb et al. | 100—189 X |
| 2,720,073 | 10/1955 | Freeman et al. | 100—189 X |
| 2,859,688 | 11/1958 | Nolt | 100—142 X |
| 2,885,953 | 5/1959 | Miller | 100—142 |
| 2,909,989 | 10/1959 | Bornzin | 100—142 |
| 2,929,313 | 3/1960 | Luthman et al. | 100—142 |
| 2,950,807 | 8/1960 | McDuffie | 100—142 X |
| 3,115,088 | 12/1963 | McDuffie | 100—142 |

LOUIS O. MAASSEL, Primary Examiner.